United States Patent
Stone et al.

(10) Patent No.: US 10,767,475 B2
(45) Date of Patent: Sep. 8, 2020

(54) EXTENDED ISENTHALPIC AND/OR ISOTHERMAL FLASH CALCULATION FOR HYDROCARBON COMPONENTS THAT ARE SOLUBLE IN OIL, GAS AND WATER

(71) Applicants: Schlumberger Technology Corporation, Sugar Land, TX (US); Chevron U.S.A. Inc., San Ramon, CA (US); Total SA, Courbevoie (FR)

(72) Inventors: Terry Wayne Stone, Hampshire (GB); Yih-Bor Chang, Sugar Land, TX (US); James Bennett, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 333 days.

(21) Appl. No.: 15/557,800

(22) PCT Filed: Mar. 22, 2016

(86) PCT No.: PCT/US2016/023500
§ 371 (c)(1),
(2) Date: Sep. 12, 2017

(87) PCT Pub. No.: WO2016/154160
PCT Pub. Date: Sep. 29, 2016

(65) Prior Publication Data
US 2018/0045046 A1    Feb. 15, 2018

Related U.S. Application Data

(60) Provisional application No. 62/136,823, filed on Mar. 23, 2015.

(51) Int. Cl.
*G06G 7/48* (2006.01)
*E21B 49/08* (2006.01)
(Continued)

(52) U.S. Cl.
CPC .......... *E21B 49/08* (2013.01); *E21B 41/0092* (2013.01); *E21B 43/00* (2013.01);
(Continued)

(58) Field of Classification Search
None
See application file for complete search history.

(56) References Cited

U.S. PATENT DOCUMENTS 5,068,051 A * 11/1991 Kikuchi ............... C11D 7/5086
252/364
6,028,992 A *  2/2000 Henriot ................... E21B 47/10
703/2

(Continued)

OTHER PUBLICATIONS

Mehra et al. Computation of Multiphase Equilibrium for Compositional Simulation, Society of Petroleum Engineers of AIME, Feb. 1982 (Year: 1982).*

(Continued)

*Primary Examiner* — Rehana Perveen
*Assistant Examiner* — Cuong V Luu
(74) *Attorney, Agent, or Firm* — Jaime A. Castano

(57) ABSTRACT

A method, apparatus, and program product to determine distribution of a plurality of components amongst a plurality of phases for a multi-component, multi-phase system including a multi-component, multi-phase fluid. A plurality of phase boundaries of the multi-component, multi-phase fluid and a vapor-liquid equilibrium (VLE) are determined based on a plurality of geophysical parameters associated with an oilfield and using one or more computer processors, including by determining hydrocarbon partitioning in a water phase, based in part on applying empirical equilibrium multi-phase mole fraction ratios (K-values) of the multi-component, multi-phase system that are functions of temperature and pressure only. In addition, an amount of at least one fluid component distributed in a plurality of phases of (Continued)

the multi-component, multi-phase system is predicted by solving a set of flash equations with the one or more computer processors based on the plurality of phase boundaries.

25 Claims, 8 Drawing Sheets

(51) Int. Cl.
    *E21B 47/10*     (2012.01)
    *E21B 43/00*     (2006.01)
    *E21B 41/00*     (2006.01)
    *G01V 99/00*     (2009.01)

(52) U.S. Cl.
    CPC .......... *E21B 47/10* (2013.01); *E21B 49/0875* (2020.05); *G01V 99/005* (2013.01)

(56) References Cited

U.S. PATENT DOCUMENTS

| | | | |
|---|---|---|---|
| 6,041,263 A | | 3/2000 | Boston et al. |
| 6,106,561 A | | 8/2000 | Farmere |
| 7,676,352 B1* | | 3/2010 | Van Peursem ......... G05B 17/02 |
| | | | 137/828 |
| 8,180,578 B2* | | 5/2012 | Stone ...................... E21B 43/24 |
| | | | 702/24 |
| 9,291,585 B2* | | 3/2016 | Singh ..................... G01N 25/00 |
| 2002/0166818 A1* | | 11/2002 | Henriot .................. E21B 49/00 |
| | | | 210/696 |
| 2009/0210174 A1* | | 8/2009 | Stone ...................... E21B 43/00 |
| | | | 702/45 |
| 2010/0223040 A1 | | 9/2010 | Peursen et al. |
| 2011/0077922 A1* | | 3/2011 | Moncorge ............... E21B 43/00 |
| | | | 703/2 |
| 2012/0004892 A1* | | 1/2012 | Pita ......................... E21B 43/00 |
| | | | 703/10 |
| 2014/0174730 A1 | | 6/2014 | Hewitt et al. |

OTHER PUBLICATIONS

Agarwal et al., "Multiphase Multicomponent Isenthalpic Flash Calculations", Journal of Canadian Petroleum Technology, vol. 30, No. 3, May-Jun. 1991, pp. 69-75.
Brantferger, et al., "Development of a Thermodynamically Consistent, Fully Implicit, Equation-of-State, Compositional Steamflood Simulator", SPE 21253 presented at the 11th Symposium on Reservoir Simulation, Anaheim, California, Feb. 17-20, 1991.
Heidari et al., "Improved Isenthalpic Multiphase Flash Calculations for Thermal Compositional Simulators," SPE 170029 MS presented at the SPE Heavy Oil Conference Canada, Alberta, Canada, Jun. 10-12, 2014.
Lapene et al., "Three-phase free-water flash calculations using a new Modified Rachford-Rice equation," Fluid Phase Equilibria vol. 297 (2010), pp. 121-128.
Michelsen, "Some Aspects of Multiphase Calculations", Fluid Phase Equilibria, vol. 30 (1986), pp. 15-29.
Michelsen, "State Function Based Flash Specifications", Fluid Phase Equilibria vols. 158-160 (1999), pp. 617-626.
Stone, et al., "A Comparison of Thermal Flashes for Systems with Heavy Oil and Component Solubility in Water," 2015 World Heavy Oil Congress.
Stone et al., "Practical and Robust Isenthalpic/Isothermal Flashes for Thermal Fluids," SPE 118893 presented at the 2009 SPE Reservoir Simulation Symposium, The Woodlands, Texas, USA, Feb. 2-4, 2009.
International Search Report and Written Opinion for the equivalent International patent application PCT/US2016/023500 dated Jun. 17, 2016.
International Preliminary Report on Patentability for the equivalent International patent application PCT/US2016/023500 dated Oct. 5, 2017.

\* cited by examiner

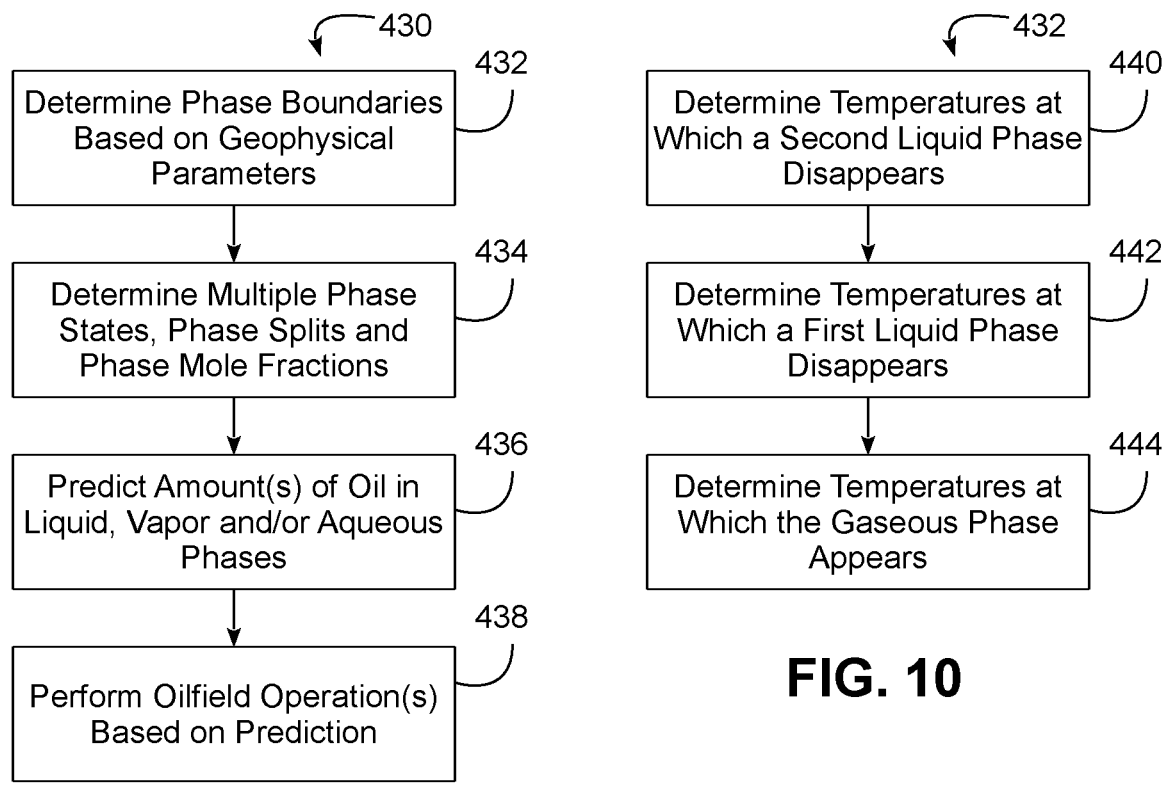
FIG. 9
FIG. 10
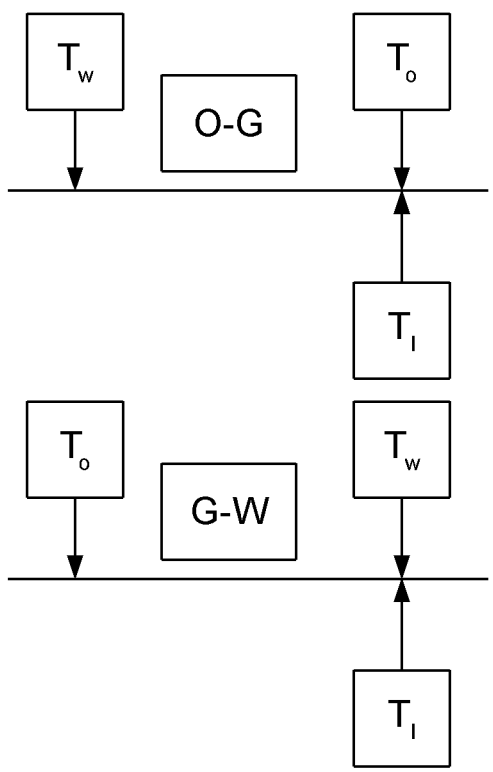
FIG. 11

EXTENDED ISENTHALPIC AND/OR ISOTHERMAL FLASH CALCULATION FOR HYDROCARBON COMPONENTS THAT ARE SOLUBLE IN OIL, GAS AND WATER

CROSS-REFERENCE TO RELATED APPLICATIONS

This application claims the filing benefit of U.S. Provisional Patent Application Serial No. 62/136,823 filed on Mar. 23, 2015, which is incorporated by reference herein in its entirety.

BACKGROUND

Some reservoir simulators rely in part on the evaluation of the state of a multi-component, multi-phase fluid and the vapor-liquid equilibrium (VLE). In contrast to black oil and compositional pressure volume temperature (PVT) calculations, it may be desirable to account for water vapor, e.g., due to steam injection, within reservoir simulation. A need therefore exists for a robust method of performing such an evaluation.

SUMMARY

The embodiments disclosed herein provide a method, apparatus, and program product that determine distribution of a plurality of components among a plurality of phases for a multi-component, multi-phase system including a multi-component, multi-phase fluid. A plurality of phase boundaries of the multi-component, multi-phase fluid and a vapor-liquid equilibrium (VLE) are determined based on a plurality of geophysical parameters associated with an oilfield and using one or more computer processors, including by determining hydrocarbon partitioning in a water phase, based in part on applying empirical equilibrium multi-phase mole fraction ratios (K-values) of the multi-component, multi-phase system that are functions of temperature and pressure only. In addition, an amount of at least one fluid component distributed in a plurality of phases of the multi-component, multi-phase system is predicted by solving a set of flash equations with the one or more computer processors based on the plurality of phase boundaries.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 9 and 10 are flowcharts depicting methods for multi-component, multi-phase fluid analysis using flash method in accordance with implementations of various technologies and techniques described herein.

FIG. 11 is a depiction of remaining liquid phase leaving a system.

DETAILED DESCRIPTION

Figure 1:
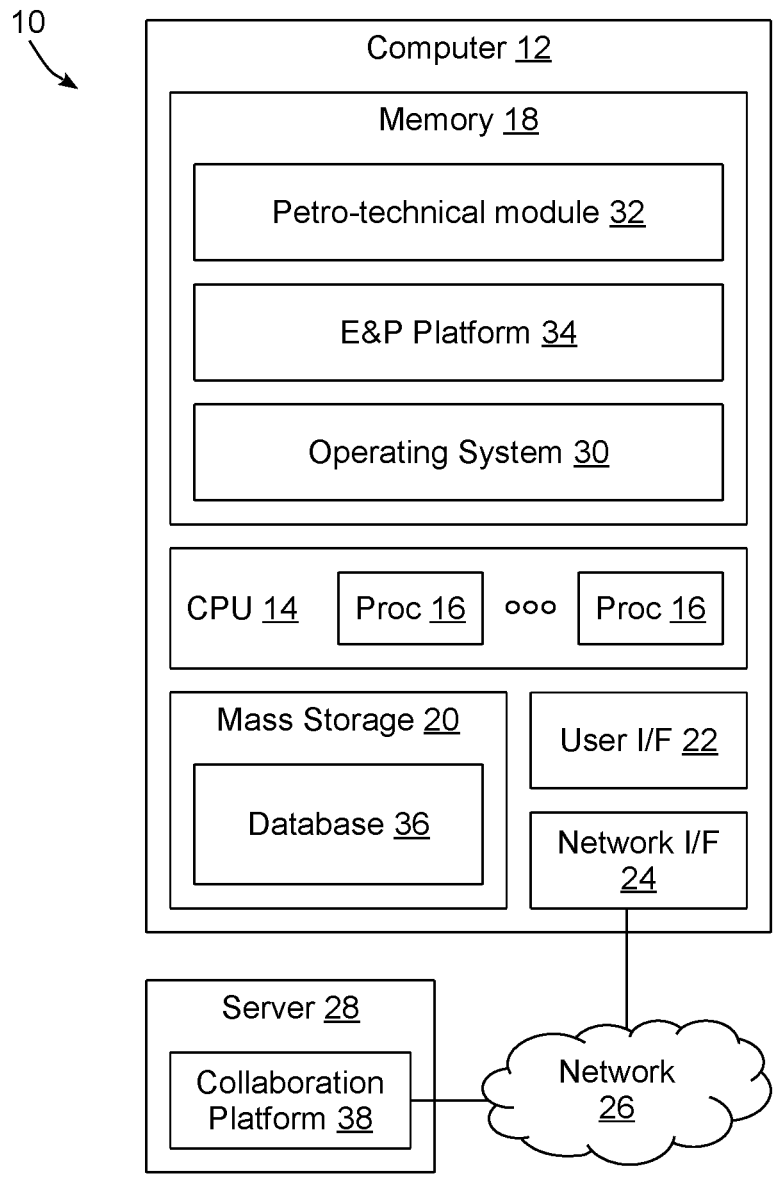
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, petro-technical module 32 may be the INTERSECT reservoir simulator, E&P platform 34 may implemented as the PETREL Exploration & Production (E&P) software platform, while collaboration platform 38 may be implemented as the STUDIO E&P KNOWLEDGE ENVIRONMENT platform, all of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention. For example, any of the functionality described herein may be implemented in a cloud computing environment and/or provided as a computer-implemented service in some embodiments.

Oilfield Operations

Figures 2A, 2B, 2C, 2D:
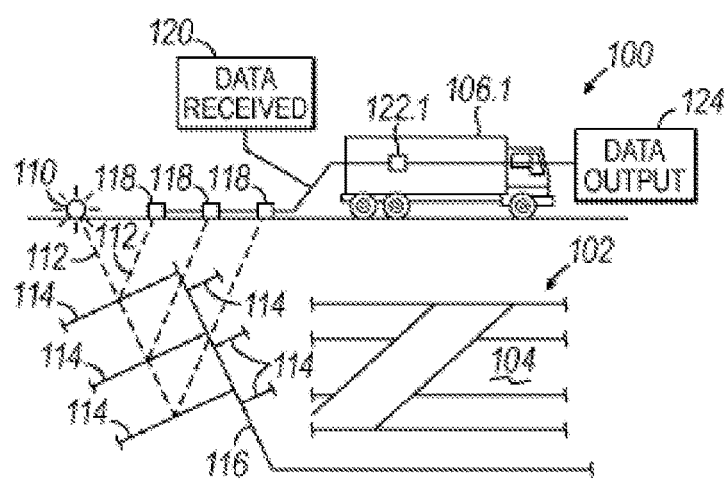
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
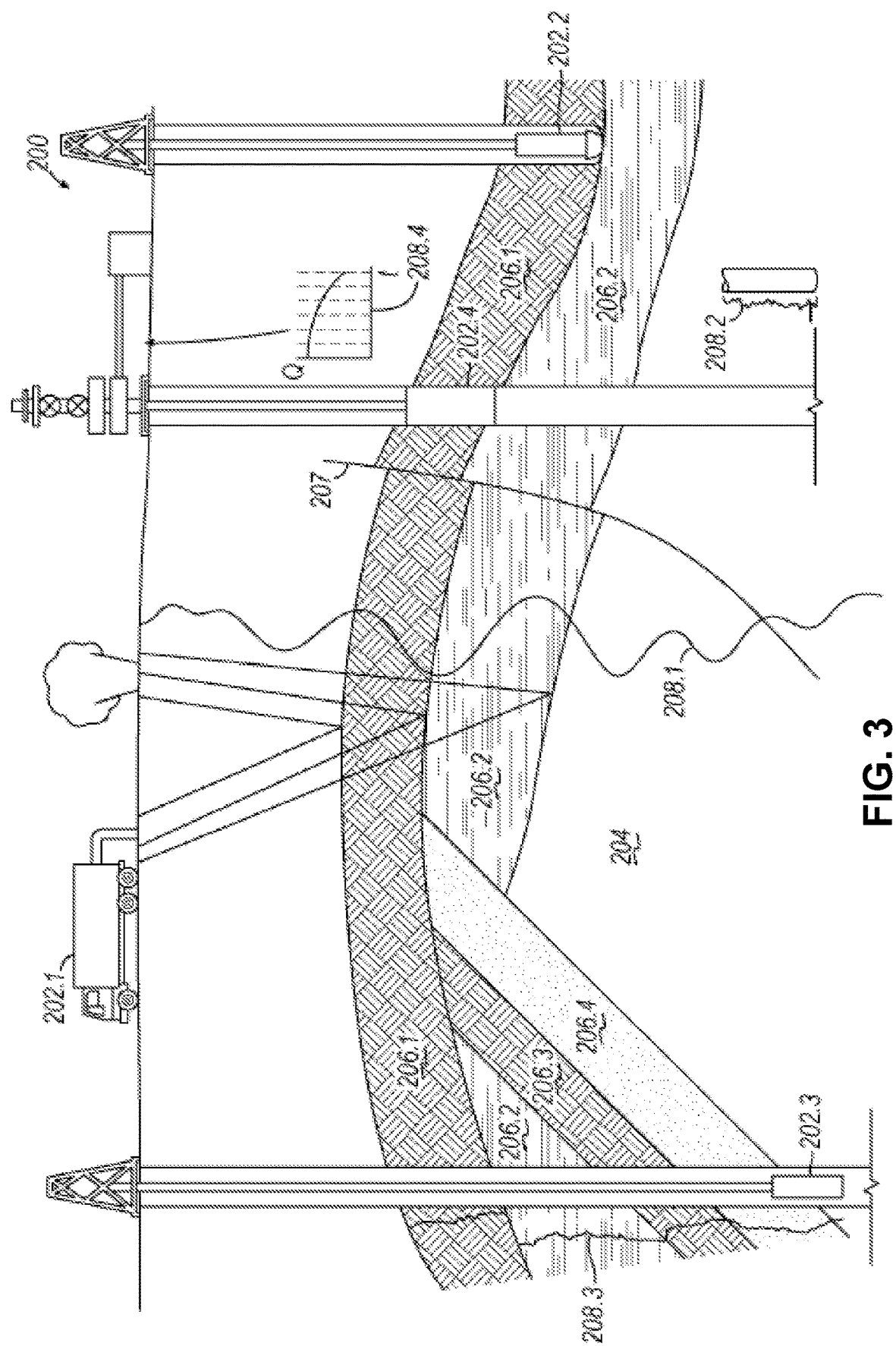
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1 a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
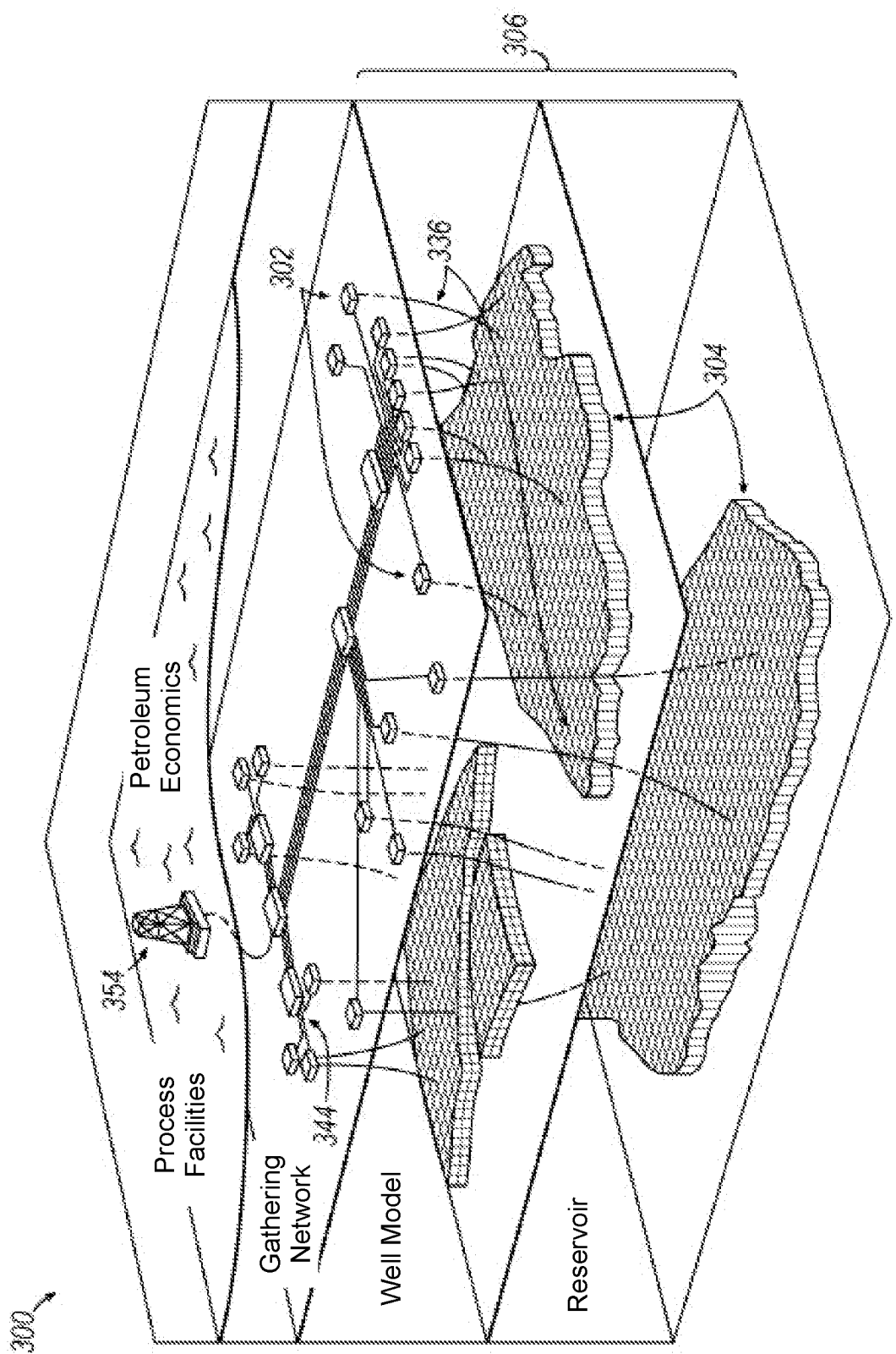
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Extended Isenthalpic and/or Isothermal Flash Calculation For Hydrocarbon Components That Are Soluble in Oil, Gas and Water Embodiments consistent with the invention may be used for a number of purposes, including for example software that allows business planning for oil and gas companies through simulation and prediction of oilfields with reservoir and surface network simulation, stand-alone PVT (pressurevolume-temperature) analysis for reserves estimation and production monitoring, well analysis and fluid sample analysis for characterization of fluids. Such embodiments may be used to provide a robust method to evaluate both the state of a multi-component, multi-phase fluid and the vapor-liquid equilibrium (VLE), by providing a fast and reliable method of determining the phase boundaries or envelope and, once this envelope is determined, of evaluating the actual moles of hydrocarbon and water components present in multiple phases (e.g., oil, water and gas phases). The herein-described method may achieve robustness in VLE computations by applying component k-value formulations that are functions of pressure and temperature only. The phase behavior and enthalpy of water may be described by means of a steam-table, which is also a function of pressure and temperature. Phases may be restricted to a maximum of liquid water, liquid oil and gas, but the methods described herein are not restricted to this particular configuration and may be used for a multiplicity of components and phases. The flash calculation as described herein may be robust, fast and for use in thermal reservoir simulation calculations.

The herein-described methods may be used in a number of scenarios and/or aspects associated with reservoir simulation, e.g., as illustrated in FIG. 4, including with for petroleum economics, with process facilities, with a gathering network, with a well model, and with a reservoir. The methods may receive, as input, a system pressure, global mole fractions of all hydrocarbon and water components and total enthalpy (energy). Oil, water and gas phase enthalpies may also be characterized.

In order to characterize initial reservoir fluids, samples may be extracted from a core. During production, hydrocarbon samples are normally collected at a field separator. Samples may also be obtained from the bottom of the well, at other points in the surface network or at the process facilities. An example of tools that gather a sample at down hole conditions is the Schlumberger Oilphase Single Phase Multisample Chamber and the multisample module of the MDT Modular Formation Dynamics Tester.

In a surface separator which is part of the process facilities, representative samples of both the liquid and the gas streams may be collected. These samples, which have been collected under pressure, may be experimentally stabilized to atmospheric conditions by a single flash process. During this process, the fluid may separate into two or more phases. The volume of the gas may be determined, and liquids may be allowed to settle to the bottom of the flash chamber after which the liquid is drained and weighed in order to calculate its density. Volumes and density data at various pressures and temperatures, moles of hydrocarbons and water in the phases (phase splits) and compositions of the phases may be used to determine correlation parameters in the mathematical models of density, k-values and enthalpies. This may be accomplished by regression using solution of the herein-described method against experimentally determined phase splits and temperature.

In reservoir simulation, a user may provide initial pressures, fluids and energy in place as well as models of the phase enthalpies and pressure/temperature K-value correlations for each of the hydrocarbon components. Water properties and K-values may be determined from built-in steam tables. From these initial conditions, a reservoir simulator may predict forward in time each of these inputs. To proceed to the next time step, an extended isenthalpic and/or isothermal K-value flash and envelope method as described herein may be calculated in each simulation grid block, in each simulation well node and in each simulation surface network node according to the operations described herein. This envelope and flash method may inform the simulator of the distribution of components amongst the phases, which may in turn allow the calculation of densities, volumes, phase enthalpies as well as flow rates of the phases and other physical quantities. The robustness, i.e. the speed of execution and correctness of the herein-described method may, in turn, determine the overall reliability of the reservoir simulation prediction. Secondly, simplicity of the envelope and flash method equations may allow faster overall convergence of the mass and energy conservation equations which the simulator is solving, thereby improving simulation performance, and in some instances, reducing the computational resources needed to run a simulation and/or reduce the run time of a simulation.

Embodiments consistent with the invention may consider an isenthalpic and/or isothermal flash calculation that is fast and robust, where solubility of components in phases is monotonically decreasing in temperature. Such embodiments may be targeted at thermal fluid systems with components that are highly aqueous soluble, e.g. $CO_2$ or $H_2S$. Applications may include $CO_2$ sequestration, sour gas production and light gas ($CH_4$) transport in thermal processes such as SAGD, CSS or steam drive. The herein-described techniques may also be extended to higher pressures, i.e. to systems where solubility of components in phases is not monotonically decreasing in temperature. The robustness of the herein-described calculations provides a technical effect at least insofar as the calculations may have reduced computing resource requirements leading to faster simulation run times and/or reduced allocations of hardware computing resources for simulations incorporating such calculations.

For example, in some embodiments, a method may be provided for determining distribution of a plurality of components amongst a plurality of phases for a multi-component, multi-phase system including a multi-component, multi-phase fluid. The method may include determining a plurality of phase boundaries of the multi-component, multi-phase fluid and a vapor-liquid equilibrium (VLE) based on a plurality of geophysical parameters associated with an oilfield and using one or more computer processors, including determining hydrocarbon partitioning in a water phase, based in part on applying empirical equilibrium multi-phase mole fraction ratios (K-values) of the multi-component, multi-phase system that are functions of temperature and pressure only; and predicting an amount of at least one fluid component distributed in a plurality of phases of the multi-component, multi-phase system by solving a set of flash equations with the one or more computer processors based on the plurality of phase boundaries.

Some embodiments also include performing an oilfield operation based upon the predicted amount, and some embodiments also include modeling an oilfield operation using at least one computer-implemented simulator, where at least a portion of the oilfield is represented by a plurality of grid blocks in the simulator, where the plurality of phase boundaries are determined and the amount of the at least one fluid component distributed in the plurality of phases is predicted for each of the plurality of grid blocks. In addition, some embodiments also include determining phase states, phase splits, and phase mole fractions associated with each of the plurality of grid blocks.

In some embodiments, determining hydrocarbon partitioning is based in part on phase behavior and enthalpy of water described by a steam table that is a function of temperature and pressure, and in some embodiments, the plurality of geophysical parameters includes geophysical parameters selected from the group consisting of global mole fractions (moles of a component/total moles of all components) of one or more volatile hydrocarbon (VHC) components of oil, global mole fractions of one or more non-volatile hydrocarbon (NVHC) components of oil, global mole fractions of one or more non-condensable hydrocarbon (NCHC) components of oil, global mole fractions of one or more water components, a pressure of the multi-component, multi-phase fluid, an enthalpy of the multi-component, multi-phase fluid, a temperature of the multi-component, multi-phase fluid, a fluid phase saturation, a fluid phase density, a component density, and a component fraction by volume or mole in a particular phase.

In some embodiments, determining the plurality of phase boundaries includes determining at least one first temperature at which a first liquid phase associated with the plurality of phase boundaries disappears, determining at least one second temperature at which a second liquid phase associated with the plurality of phase boundaries disappears, and determining at least one third temperature at which the gaseous phase appears. In addition, in some embodiments, the first liquid phase is present when the second liquid phase disappears, the second temperature is determined based on the first temperature and is lower than or equal to the first temperature, the third temperature is determined based on the second temperature and is lower than or equal to the second temperature, and the at least one first, at least one second, and at least one third temperatures are determined in part by using pressure and temperature dependent empirical equilibrium multi-phase mole fraction ratios (K-values) of the multi-component, multi-phase system.

In some embodiments, determining the plurality of phase boundaries includes determining a succession of temperatures where a liquid phase may disappear and/or reappear one or more times, and some embodiments further include one or both of determining at least one temperature at which an additional liquid phase disappears or determining at least one temperature at which an additional gaseous phase appears. Further, in some embodiments determining the at least one first temperature at which the first liquid phase disappears includes determining the at least one first temperature at which oil disappears before water, while in some embodiments determining the at least one first temperature at which the first liquid phase disappears includes determining the at least one first temperature at which water disappears before oil. In addition, in some embodiments, predicting the amount of an at least one fluid component distributed in a plurality of phases of the multi-component, multi-phase system includes predicting the amount of a hydrocarbon component in liquid, water and gas phases.

Other embodiments may include an apparatus including one or more computer processors and a memory having instructions that when executed by the one or more computer processors perform any of the above-described operations. Still other embodiments may include a program product including a computer readable medium and program code stored on the computer readable medium and configured upon execution by one or more computer processors to perform any of the above-described operations.

Component Solubility In An Aqueous Phase

Figure 5:
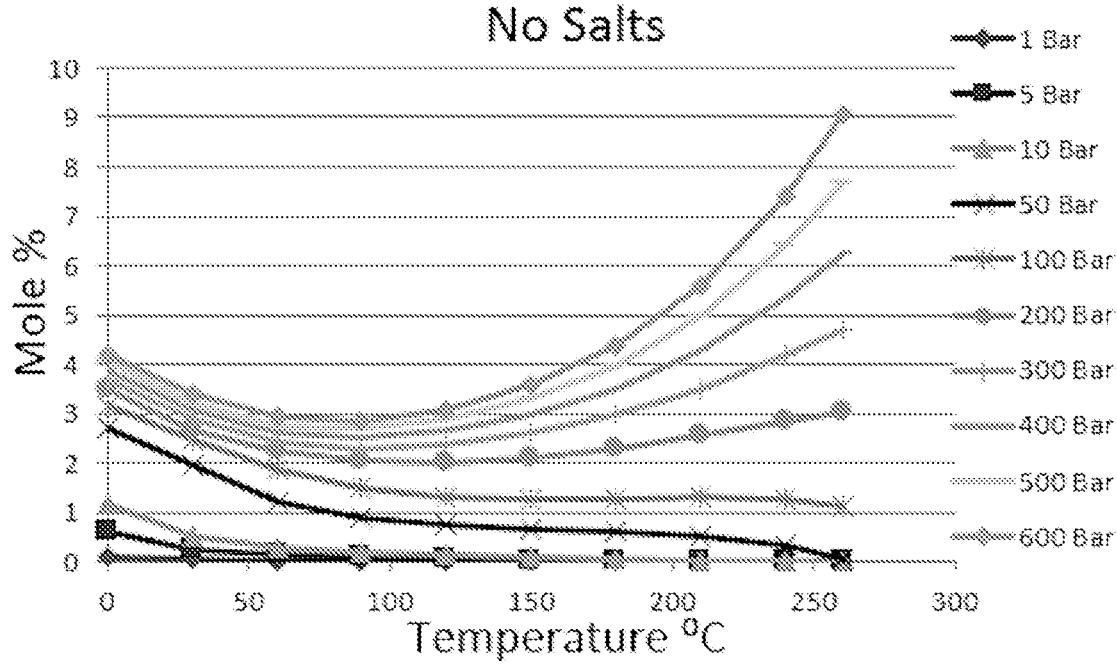
FIG. 5 illustrates $CO_2$ solubility in aqueous phase (no salts).

Components that display high solubility in the aqueous phase may not have solubilities that are monotonic with temperature. For example, FIG. 5 shows $CO_2$ solubility in an aqueous phase as a function of temperature and pressure. It may be seen that for higher pressures, greater than ~40 bars, solubility is decreasing and then increasing with temperature. At lower pressures, the K-value, which is approximately the inverse of solubility, is monotonically increasing with temperature. This can lead to a phase envelope where, at a given pressure, there can be several bubble points.

Figure 6:
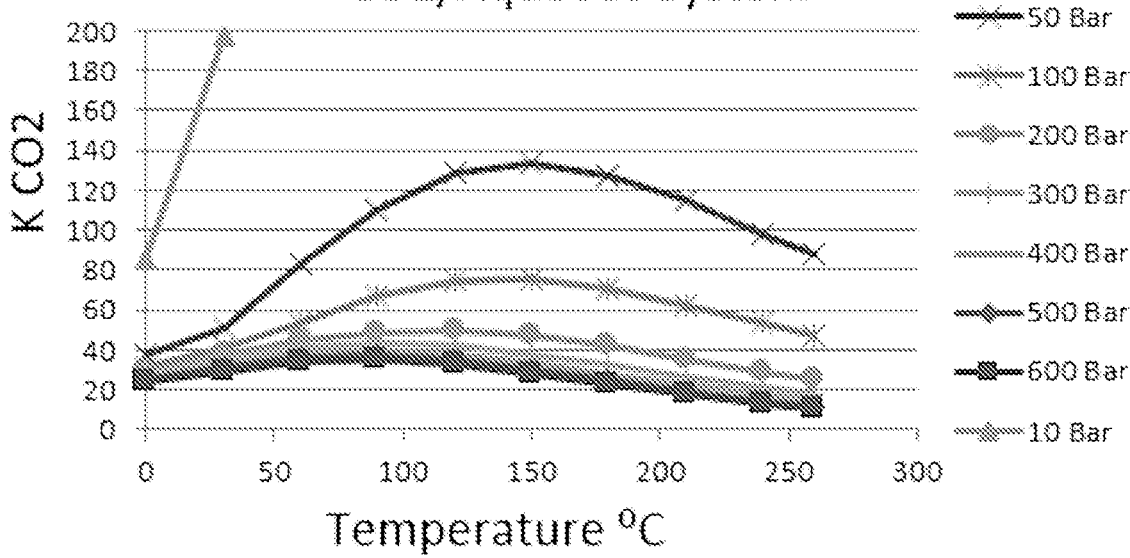
FIG. 6 illustrates $CO_2$ K-values in an aqueous system.

The corresponding K-values are shown below in FIG. 6. These are much larger in magnitude at lower pressures. For example, values at 10 Bar shown in this figure are monotonically increasing with temperature (truncated to demonstrate the non-monotone nature of the K-values at higher pressures). It may be seen that at pressures 50 bars and above, there is a maximum point where the derivative of the K-value with temperature changes sign. Note that the K-values shown in FIG. 6 are the ratio of $CO_2$ vapour fraction to $CO_2$ aqueous fraction in a two-component system.

Figure 7:
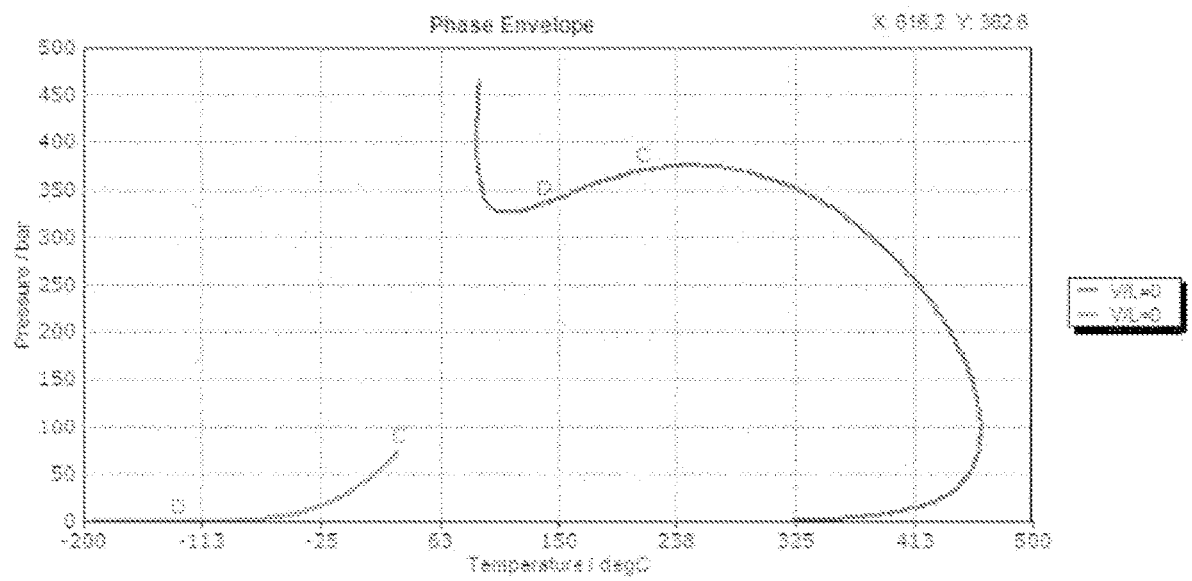
FIG. 7 illustrates a phase envelope of a $CO_2$-water system (98% $CO_2$) in a P-T diagram.

FIG. 7 shows a P-T diagram of a $CO_2$-Water system with 98% $CO_2$ feed. At higher pressures, e.g. 350 Bar, the blue line shows multiple bubble points. At a pressure of 50 Bar, the state goes from LIQ-AQU to LIQ-AQU-VAP to AQU-VAP (crossing the leftmost line and the missing dew line) to VAP (crossing the rightmost line). Other light hydrocarbon components commonly found in oil fields, for example methane, can also display this type of behavior at higher pressures.

In the following sections, algorithms for robust envelope and isenthalpic and/or isothermal flash calculations are restricted to lower pressures where solubilities and K-values are monotonic with temperature. However, it may be possible to extend these methods to higher pressures. This is discussed below.

Envelope Calculation

Envelope calculation methods consistent with the invention extend other techniques, e.g., as described in U.S. Pat. No. 8,180,578 to Stone et al., which is assigned to the same assignee as the present application, and which is incorporated by reference herein.

Figure 8:
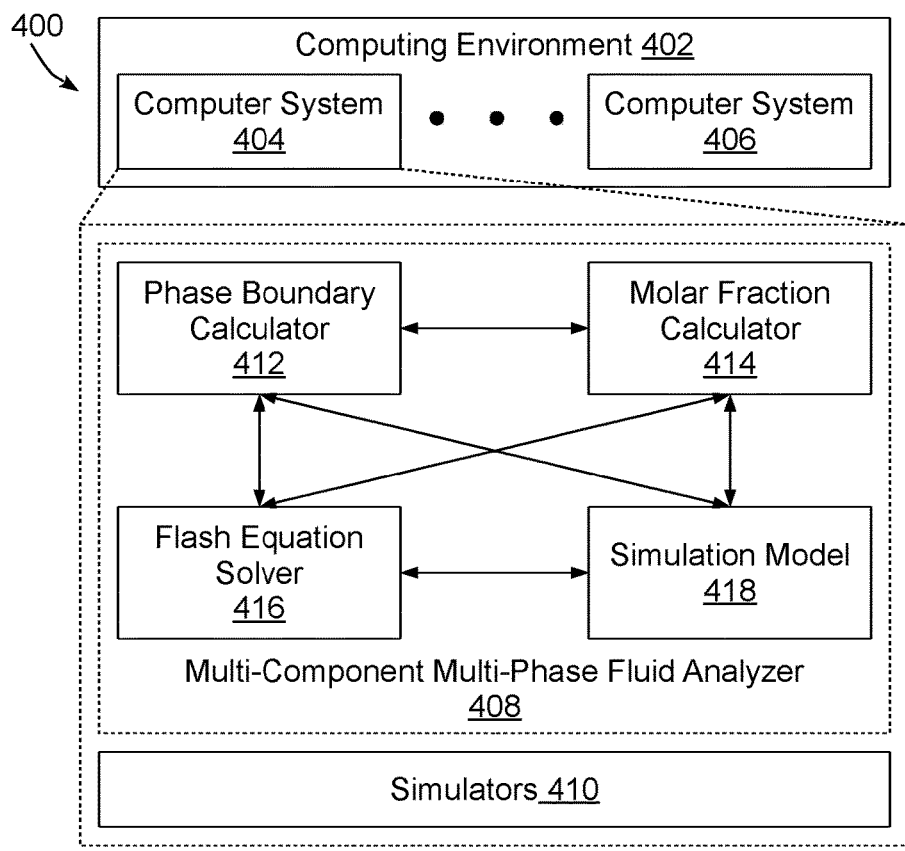
FIG. 8 shows a system for performing multi-component, multi-phase fluid analysis in accordance with implementations of various technologies and techniques described herein.

FIG. 8, for example, illustrates a system 400 capable of implementing the herein-described envelope calculation operations. System 400 may include a computing environment 402 including one or more computer systems 404, 406 configured to perform oilfield operations such as running flow, reservoir, or network simulations, or any process where a feed stream is separated into a vapor, liquid, aqueous product, or more generally where any feed stream is separated into a multiplicity of phases. Specifically, these processes may include taking fluid samples from downhole, riser, surface pipelines, settling tanks, storage tanks, etc., before or during production operations to determine the overall component content and temperature and pressure, then using the envelope calculation operations to determine the final equilibrium phase state, and generally assuming the sample is not in equilibrium at the time of sampling.

In one or more embodiments, the computer system(s) may be web servers, embedded systems (e.g., a computer located in a downhole tool), desktop computers, laptop computers, personal digital assistants, cloud-based computer systems, server-based computer systems, any other similar type of computer system, or any combination thereof. Specifically, in one or more embodiments, one or more of the computer systems (e.g., 404, 406) may include a multi-component, multi-phase fluid analyzer 408 and one or more simulators 410 (e.g., a reservoir simulator, a network simulator, etc.). The multi-component, multi-phase fluid analyzer may include a number of interconnected modules, including one or more phase boundary calculators 412, one or more molar fraction calculators 414, one or more flash equation solvers 416 and one or more simulation models 418. In one or more embodiments, the aforementioned components (i.e., 410, 412, 414, 416, 418) may be located in a single computer system (e.g., 404, 406), distributed across multiple computer systems (e.g., 404, 406), or any combination thereof. In one or more embodiments, each of the aforementioned components (i.e., 410, 412, 414, 416, 418) may include one or more software modules, one or more hardware modules, or any combination thereof. Further, in one or more embodiments, the aforementioned components (i.e., 410, 412, 414, 416, 418) may be configured to communicate with each other via function calls, application program interfaces (APIs), a network protocol (i.e., a wired or wireless network protocol), electronic circuitry, any other similar type of communication and/or communication protocol, or any combination thereof.

In one or more embodiments, phase boundary calculator 412 is configured to determine phase boundaries of a multi-component, multi-phase fluid system (e.g., fluid in a portion of an oilfield) based on geophysical parameters associated with the fluid in the portion of the oilfield using pressure and temperature dependent empirical equilibrium multi-phase mole fraction ratios (K-values) of the fluid. More details of determining phase boundaries of the multi-component, multi-phase fluid system are described with respect to FIGS. 9 and 10 below.

In one or more embodiments, molar fraction calculator 414 is configured to predict an amount of oil in a liquid oil phase in the portion of the oilfield by solving a set of flash equations based on the phase boundaries determined by phase boundary calculator 412. More details of predicting the amount of oil in the liquid oil phase are described with respect to FIGS. 9 and 10 below.

In one or more embodiments, flash equation solver 416 is configured to solve flash equations at phase transition points of the multi-component, multi-phase fluid system. More details of solving flash equations at phase transition points are described with respect to FIGS. 9 and 10 below. In one or more embodiments, simulation model 418 may be configured to be used by simulators 410 for modeling oilfield operations.

FIGS. 9 and 10 are flowcharts depicting use of an isenthalpic and/or isothermal K-value flash and envelope method for performing oilfield operations in accordance with one or more embodiments. In one or more embodiments, one or more of the elements shown in FIGS. 9 and 10 may be omitted, repeated, and/or performed in a different order. Accordingly, embodiments of the method should not be considered limited to the specific arrangements of elements shown in FIGS. 9 and 10.

As shown in FIG. 9, for example, a sequence of operations 430 may include a determination of phase boundaries based on geophysical parameters in block 432, e.g., using phase boundary calculator 412 of FIG. 8. The types of geophysical parameters that may be used in the determination of phase boundaries may include, for example, a global mole fraction of a volatile hydrocarbon (VHC) component of oil, a global mole fraction of a non-volatile hydrocarbon (NVHC) component of oil, a global mole fraction of a non-condensable hydrocarbon (NCHC) component of oil, a global mole fraction of water, pressure of the fluid, enthalpy of the fluid, temperature of the fluid, etc. Other geophysical parameters may include fluid phase saturations (fraction of pore volume occupied by a particular phase), fluid phase densities, component densities, component fractions by volume or mole in a particular phase, all of which may be used to calculate the global mole fraction (moles of component/total moles of all components) of a particular component. Next, in block 434, a flash or VLE calculation may be performed using flash equation solver 414 of FIG. 8 to determine multiple phase states, phase splits and phase mole fractions. Among these multiple phase states, phase splits and phase mole fractions, as will become more apparent below, is a hydrocarbon partitioning in a water phase, based in part on applying empirical equilibrium multi-phase mole fraction ratios (K-values) of the multi-component, multi-phase system that are functions of temperature and pressure only. In some embodiments, for example, the hydrocarbon partitioning may be based in part on phase behavior and enthalpy of water described by a steam table that is a function of temperature and pressure.

Next, based on the results of blocks 432 and 434, block 436 predicts the amount(s) of hydrocarbon (oil) in liquid, vapor and/or aqueous phases, for example as a function of time, e.g., using molar fraction calculator 416 of FIG. 8 to solve a set of flash equations based upon the determined phase boundaries. Thereafter, in block 438 one or more oilfield operations may be performed based on these results, for example, to perform planning or diagnostic activities according to the amount(s) of hydrocarbons in the various phases predicted in block 436.

Now turning to FIG. 10, the determination of phase boundaries in block 432 of FIG. 9 may be implemented in some embodiments using blocks 440, 442 and 444. Block 440 determines one or more temperatures at which a second liquid phase disappears, block 442 determines one or more temperatures at which a first liquid phase disappears, and block 444 determines one or more temperatures at which the gaseous phase appears. The temperatures at which the first and second liquid phases disappear and the gaseous phase appears may in some embodiments correspond to the phase transition temperatures $T_1$, $T_2$, and $T_3$ described herein, and the details of blocks 440, 442 and 444 are described in greater detail below.

Phase Equilibrium Constraints

Phase equilibrium constraints may be formulated for a thermal reservoir simulator or well model which contains a variable set that includes a total fluid enthalpy H, nc+1 total mass fractions $Z_i$ where nc is the number of hydrocarbon components and the additional component is water, and the flowing well or segment pressure $P_{wf}$. The total fluid enthalpy is a weighted combination of the phase enthalpies $h_{gas}$, $h_{oil}$ and $h_{water}$, $$H = V \cdot h_{gas} + L \cdot h_{oil} + A \cdot h_{water} \qquad (1)$$

where L is the oil phase split $$\left( \frac{\text{moles oil phase}}{\text{total moles}} \right),$$

V is the vapor phase split $$\left( \frac{\text{moles gas phase}}{\text{total moles}} \right)$$

and A is the water or aqueous phase split $$\left( \frac{\text{moles water phase}}{\text{total moles}} \right).$$

Phase enthalpies are functions of the component enthalpies and liquid, gas and water phase mole fractions $x_i$, $y_i$, $w_i$.

These phase mole fractions, in turn, are functions of pressure and temperature dependent K-values, the feed $Z_i$ and phase splits L, V and A.

To describe the amount of a hydrocarbon component present in all phases, it can be stated that component i is in equilibrium between phases j and k when the following relationship is satisfied:

$$x_{i,j} = K_{i,jk} x_{i,k} \quad (2)$$

where
- k = the master phase for component i.
- j = a phase into which component i partitions.
- $K_{i,jk}$ = the K-value for component i in phase j.
- $x_{i,j}$ = the mole fraction of component i in phase j.

For example, taking a specific component i that is soluble in oil and gas phases, then the mole fraction of this component in the gas phase is $$y_i = K_{i,VL} \cdot x_i \quad (3)$$

and if this component is also soluble in the water phase, the mole fraction of this component in the gas phase is also $$y_i = K_{i,VA} \cdot w_i \quad (4)$$

For those hydrocarbon components that are only soluble in the oil and gas phases, $$Z_i = L x_i + V y_i \quad (5)$$

and the mole fraction of these components in the oil may be expressed using Eq. (3) as, $$x_i = \frac{Z_i}{L + V K_{i,VL}}, \quad i \in vhLV \quad (6)$$

and in the gas as, $$y_i = \frac{Z_i K_{i,VL}}{L + V K_{i,VL}}, \quad i \in vhLV \quad (7)$$

where vhLV refers to the set of volatile hydrocarbons that are only soluble in the oil and gas phases.

For the remaining hydrocarbon components that are soluble in all three phases, $$Z_i = L x_i + V y_i + A w_i \quad (8)$$

so that mole fractions in gas are $$y_i = \frac{Z_i K_{i,VL} K_{i,VA}}{L K_{i,VA} + V K_{i,VA} K_{i,VL} + A K_{i,VL}}, \quad i \in vhLVA \quad (9)$$

mole fractions in oil are $$x_i = \frac{Z_i K_{i,VA}}{L K_{i,VA} + V K_{i,VA} K_{i,VL} + A K_{i,VL}}, \quad i \in vhLVA \quad (10)$$

and mole fractions in water are $$w_i = \frac{Z_i K_{i,VL}}{L K_{i,VA} + V K_{i,VA} K_{i,VL} + A K_{i,VL}}, \quad i \in vhLVA \quad (11)$$

Here, vhLVA refers to the set of volatile hydrocarbon components that are soluble in oil, gas and water phases.

The water component fraction in the gas phase may be expressed as $$y_w = K_{ww}(T) \cdot w_w \quad (12)$$

where $K_{ww}(T)$ is calculated from Henry's law $$K_{ww}(T) = \frac{P_{sat}(T)}{P} \quad (13)$$

Since water is only present in aqueous and vapor phases, $$Z_w = A \cdot w_w + V \cdot y_w \quad (14)$$

and using (12), the mole fraction of water in the water phase, $w_w$, may be expressed as $$w_w = \frac{Z_w}{A + V \cdot K_{ww}(T)} \quad (15)$$

It will be appreciated that the above Eqs. (1)-(15) may, in some embodiments, be extended naturally to systems with more than three identifiable phases, and are simply an illustration of a system with an identifiable liquid oil, liquid water and vapor phase.

Components that are only resident in the oil phase, i.e. are nonvolatile, are labelled nvh. Hydrocarbon components that are only present in the gas phase, i.e. are non-condensable, are labelled nch. The above Eqs. (1)-(15) may be extended to include water solubility in the oil phase. Another K-value described by Eq. (4) may be introduced for equilibrium of water between the oil and vapor phases. However, this situation is rarely modeled in a thermal reservoir simulator and so is omitted here.

For a given pressure and total enthalpy, critical enthalpies may be constructed at the phase boundaries using appropriate temperatures, phase splits and phase mole fractions. Since enthalpy is monotonic in temperature, i.e. the system heat capacity $$\left. \frac{\partial h}{\partial T} \right|_P > 0,$$

these critical enthalpies are unique. The total enthalpy may then be compared against the critical enthalpies and the state is determined.

Calculating Critical Enthalpies at Phase Boundaries

For a given pressure and temperature, critical temperatures may be calculated at phase boundaries. The given temperature may then be compared to these critical temperatures to determine the phase state.

The following describes algorithms to calculate critical enthalpies for appearance of a gas phase, $H_{c,gas}$, disappearance of a water phase, $H_{c,wat}$, and disappearance of an oil phase, $H_{c,oil}$. These critical enthalpies require temperatures to be computed for disappearance of the remaining liquid phase, $T_1$, first disappearance of a liquid phase, $T_2$, and appearance of the gas phase, $T_3$. While the example discussed hereinafter relies on three phases (a gas phase, a water phase and an oil phase), it will be appreciated that in other embodiments, the herein-described techniques may be applied to different and/or additional liquid and/or gaseous phases, e.g., liquid phases such as diesel, solvent, carbon dioxide, etc. phases and gaseous phases such as foam, free gas, or any group of component or fluid particles (atoms) that have identifiable flow characteristics and can, collectively, be identified as a "phase".

Disappearance of the Remaining Liquid Phase (block 440)

Compute $T_w$ iterated from $$0 = 1 - \sum_{i \in vhLVA} w_i - w_w \qquad (16)$$

$$= 1 - \sum_{i \in vhLVA} \frac{Z_i}{K_{i,VA}(T_w)} - \frac{Z_w}{K_{ww}(T_w)}$$

If there is no nvh in the system, calculate $T_o$ iterated from $$0 = 1 - \sum_{i \in vh} x_i = 1 - \sum_{i \in vh} \frac{Z_i}{K_{i,VL}(T_o)} \qquad (17)$$

If non-volatiles exist in the system, set $T_o = \infty$.

If water is the remaining liquid phase and has just disappeared with a rise in temperature, then the sum of the hydrocarbon and water components in the aqueous phase sums to unity, which is Eq. (16). Similarly, Eq. (17) arises when water as a liquid phase has already disappeared, there is only a trace of liquid oil left in the system, i.e. $L \to 0$, consequently the vapor phase is approaching unity, $V \to 1$, and the volatile hydrocarbon components in the liquid phase must still sum to 1.

Set $$T_1 = \max(T_w, T_o) \qquad (18)$$

$T_1$ is the temperature at which the remaining liquid phase leaves the system. This situation is depicted in FIG. 11.

If $T_1 = T_w$, set $$H_{c,wat} = h_{gas}(P_{wf}, T_1, y_i = Z_i) \qquad (19)$$

where $h_{gas}(P_{wf}, T_1, y_i = Z_i)$ is the sum over all components of the global mole fraction of that component multiplied by the gas enthalpy of that component evaluated at $P_{wf}, T_1$.

If $T_1 = T_o$ and there are no nonvolatile hydrocarbon components in the system, set $$H_{c,oil} = h_{gas}(P_{wf}, T_1, y_i = Z_i) \qquad (20)$$

If there is nvh in the system, set $$H_{c,oil} = \infty \qquad (21)$$

First Disappearance of a Liquid Phase-Oil Disappeared First (block 442)

Figure 12:
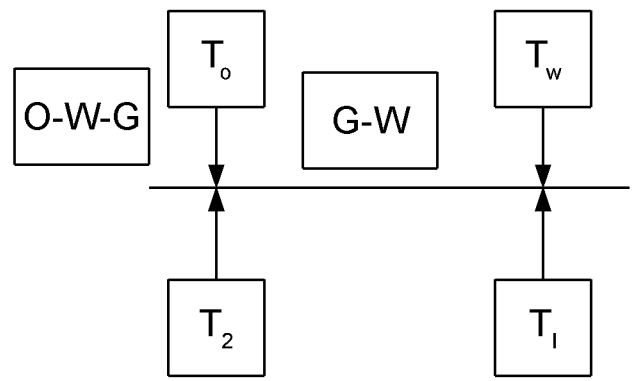
FIG. 12 is a depiction of oil disappearing from a system first.

If $T_1 = T_w$, then oil disappeared from the system first and at $T_2$ there is still some water in the system. Since oil disappeared first, there are no nonvolatile hydrocarbons present. Between $T_1$ and $T_2$, as depicted in FIG. 12, $$L = 0 \qquad (22)$$

At $T_2$, $$0 = 1 - \sum_i x_i \qquad (23)$$

$$= 1 - \sum_{i \in LV} x_i - \sum_{i \in LVA} x_i$$

$$= 1 - \sum_{i \in LV} \frac{Z_i}{V_2 K_{i,VL}(T_2)} -$$

$$\sum_{i \in LVA} \frac{Z_i K_{i,VA}(T_2)}{(V_2 K_{i,VA}(T_2) + (1 - V_2)) K_{i,VL}(T_2)}$$

Also, $$0 = \sum_i (w_i - y_i) \qquad (24)$$

$$= \sum_{i \in vhLVA} (w_i - y_i) - \sum_{i \in vhLV} y_i - \sum_{i \in nch} y_i + w_w - y_w$$

$$= \sum_{i \in vhLVA} \frac{Z_i(1 - K_{i,VA}(T_2))}{V_2 K_{i,VA}(T_2) + (1 - V_2)} - \frac{Z_{vhLV}}{V_2} - \frac{Z_{nch}}{V_2} +$$

$$\frac{Z_w(1 - K_{ww}(T_2))}{V_2 K_{ww}(T_2) + (1 - V_2)}$$

where the relation $$\sum_{i \in vhLV} y_i = \sum_{i \in vhLV} \frac{Z_i}{V} = \frac{Z_{vhLV}}{V} \qquad (25)$$

has been used in the right hand side of (24). This gives two equations in two unknowns $V_2$ and $T_2$.

A critical enthalpy for disappearance of oil may then be calculated as $$H_{c,oil} = \qquad (26)$$
$$V_2 \cdot h_{gas}(P_{wf}, T_2, x_i(T_2, V_2)) + (1 - V_2) \cdot h_{wat}(P_{wf}, T_2, w_i(T_2, V_2))$$

First Disappearance of a Liquid Phase-Water Disappeared First (block 442)

Figure 13:
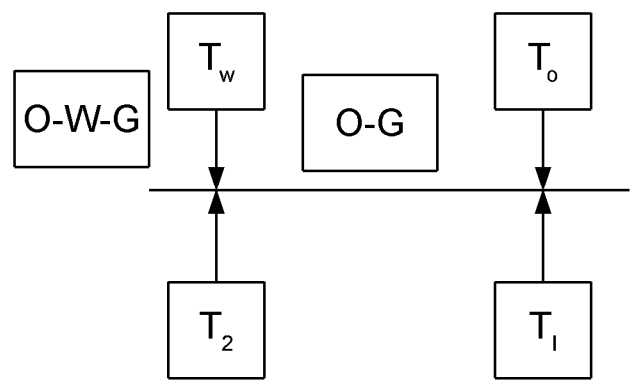
FIG. 13 is a depiction of water disappearing from a system first.

If $T_1 = T_o$, then water disappeared first and at $T_2$ there is still some oil in the system. Between $T_1$ and $T_2$ as depicted in FIG. 13, $$A = 0 \qquad (27)$$

Then at $T_2$, solve $$0 = 1 - \sum_i w_i \qquad (28)$$

$$= 1 - \sum_{i \in LVA} w_i - w_w$$

$$= 1 - \sum_{i \in LVA} \frac{Z_i K_{i,VL}(T_2)}{(1 - V_2 + V_2 K_{i,VL}(T_2)) K_{i,VA}(T_2)} -$$

$$\frac{Z_w}{V_2 K_{ww}(T_2)}$$

$$0 = \sum_i (x_i - y_i) \qquad (29)$$

$$= \sum_{i \in nvh} x_i + \sum_{i \in LV + LVA} (x_i - y_i) - \sum_{i \in nch} y_i - y_w$$

$$= \frac{Z_{nvh}}{1 - V_2} + \sum_{i \in vh} \frac{Z_i(1 - K_{i,VL}(T_2))}{1 - V_2 + V_2 K_{i,VL}(T_2)} - \frac{Z_{nch}}{V_2} - \frac{Z_w}{V_2}$$

which are two equations in two unknowns $V_2$ and $T_2$.

The critical enthalpy for disappearance of water may then be calculated as $$H_{c,wat} = \qquad (30)$$
$$(1 - V_2) \cdot h_{oil}(P_{wf}, T_2, x_i(T_2, V_2)) + V_2 \cdot h_{gas}(P_{wf}, T_2, y_i(T_2, V_2))$$

First Disappearance of a Liquid Phase-Appearance of Gas (block 444)

Figure 14:
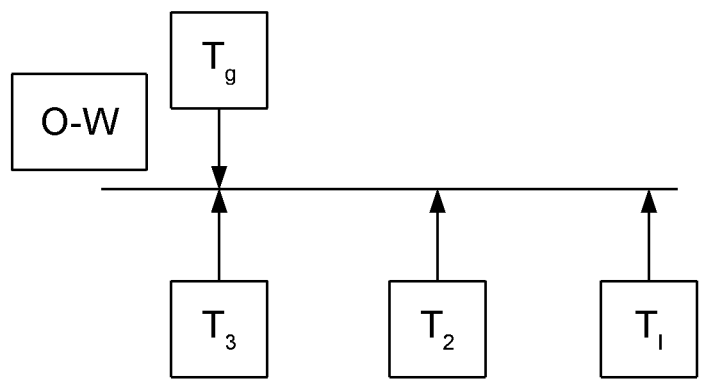
FIG. 14 illustrates a bubble point at a temperature $T_3$.

Let $T_3$ be the temperature when gas appears, also known as the bubble point. This is depicted in FIG. 14.

If there are no non-condensable hydrocarbons in the system, the hydrocarbon system is at bubble point status, i.e.

$$V=0 \qquad (31)$$

Since a gas phase is just starting to appear, and liquid and aqueous phases are already established, we choose the two sets of equations for the two variables $T_3$ and $L_3$ to be:

$$0 = \sum_i (y_i - x_i) \qquad (32)$$
$$= \sum_{i \in vhLVA} \frac{Z_i K_{i,VA}(T_3)(K_{i,VL}(T_3) - 1)}{L_3 K_{i,VA}(T_3) + (1 - L_3) K_{i,VL}(T_3)} +$$
$$\sum_{i \in vhLV} \frac{Z_i(K_{i,VL}(T_3) - 1)}{L_3} + \frac{Z_w K_{ww}(T_3)}{1 - L_3} - \frac{Z_{nvh}}{L_3}$$

$$0 = \sum_i (y_i - w_i) \qquad (33)$$
$$= \sum_{i \in vhLVA} \frac{Z_i K_{i,VL}(T_3)(K_{i,VA}(T_3) - 1)}{L_3 K_{i,VA}(T_3) + (1 - L_3) K_{i,VL}(T_3)} +$$
$$\sum_{i \in vhLV} \frac{Z_i K_{i,VL}(T_3)}{L_3} + \frac{Z_w(K_{ww}(T_3) - 1)}{1 - L_3}$$

A critical enthalpy for appearance of gas may be calculated as $$H_{c,gas} = \qquad (34)$$
$$L_3 \cdot h_{oil}(P_{wf}, T_3, x_i(T_3, L_3)) + (1 - L_3) \cdot h_{water}(P_{wf}, T_3, w_i(T_3, L_3))$$

unless there are nch in the system in which case $$H_{c,gas} = -\infty \qquad (35)$$

All of the above may or may not need to be calculated in some embodiments. First, to determine if the system is in a gas-only state, i.e. disappearance of the last liquid phase, Eqs. (16) and (17) are very quick to calculate. If the total system enthalpy H is greater than critical enthalpies calculated in Eqs. (19) or (20) depending on the final liquid phase to leave the system, then the flash calculation for a gas-only state may be immediately calculated. Similarly, for a given temperature instead of a given total enthalpy, the given temperature may be compared directly against the temperature $T_1$ to determine if the state is gas-only. Second, failing this, the bubble point may then be calculated and H compared to the critical enthalpy (or T compared to the critical temperature $T_3$) for appearance of gas, Eq. (34). If less than this quantity, the oil-water flash may be performed and the flash may be exited. If neither of the above situations is encountered, then the remaining $T_2$ calculations and critical enthalpies may be completed in order to determine whether the state is oil-water-gas, oil-gas or gas-water. Temperatures and phase splits from previous calculations may be used to help with convergence of these calculations.

Also, the formulations presented above are not the only ones available to express mass balance at the appearance or disappearance of phases. Formulation of a set of equations may be important for convergence in some embodiments. Those expressed above have been found to be robust when calculating the phase envelope. In some circumstances, alternate formulations may be used to aid convergence.

In particular, the set of equations for the bubble point or $T_3$, $L_3$ evaluation may be $$0 = 1 - \sum_i y_i, \qquad (i)$$

(ii) one of Eqs. (32) or (33). An alternate when calculating first disappearance of an oil phase, Eqs. (23) and (24) are $$0 = \sum_i (x_i - y_i), \qquad (i)$$

$$0 = \sum_i (x_i - w_i). \qquad (ii)$$

Also, an alternate for determination of disappearance of the water phase, Eqs. (28) and (29) is $$0 = \sum_i (w_i - y_i), \qquad (i)$$

$$0 = \sum_i (w_i - x_i). \qquad (ii)$$

Note that in each of these alternates, the Rachford-Rice equation emphasizes the phase that is appearing or disappearing, i.e. component mole fractions of the appearing/disappearing phase are repeated in both Rachford-Rice equations. In the case of the bubble point calculation, this has already been done in Eqs. (32) and (33). All of these alternate formulations may be used in some embodiments of the invention.

Flash Calculation

When the state is known, the following flash calculations may be performed depending on a comparison of the total enthalpy H to critical enthalpies described above, e.g., using flash equation solver 416 of FIG. 8.

OW flash, $H \leq H_{c,gas}$

Solve the following equations for unknowns L and T, $$0 = \sum_i (x_i - w_i) \qquad (36)$$
$$= \sum_{i \in nvh} x_i + \sum_{i \in LV} x_i + \sum_{i \in LVA} (x_i - w_i) - w_w$$
$$= \frac{Z_{nvh}}{L} + \frac{Z_{LV}}{L} +$$
$$\sum_{i \in LVA} \frac{Z_i(K_{i,VA}(T) - K_{i,VL}(T))}{LK_{i,VA}(T) + (1 - L)K_{i,VL}(T)} - \frac{Z_w}{1 - L}$$

and $$0 = H - L \cdot h_{oil}(T, x_i(T, L)) - (1 - L) \cdot h_{wat}(T, w_i(T, L)) \qquad (37)$$

Similarly, if the system temperature T is given instead of the total enthalpy, then simply omit the energy balance equation (37) and solve equation (36) for L.

OWG flash, $H_{c,gas} \leq H \leq H_2$

Solve the following equations for unknowns L, V and T, $$0 = \sum_i (x_i - y_i) \qquad (38)$$

$$= \sum_{i \in nvh} x_i + \sum_{i \in vh} (x_i - y_i) - \sum_{i \in nch} y_i - y_w$$

$$= \frac{Z_{nvh}}{L} + \sum_{i \in vhLV} \frac{Z_i(1 - K_{i,VL}(T))}{L + VK_{i,VL}(T)} +$$

$$\sum_{i \in LVA} \frac{Z_i K_{i,VA}(T)(1 - K_{i,VL}(T))}{LK_{i,VA}(T) + VK_{i,VA}(T)K_{i,VL}(T) + (1 - L - V)K_{i,VL}(T)} -$$

$$\frac{Z_{nch}}{V} - \frac{Z_w K_{ww}(T)}{1 - L - V + VK_{ww}(T)}$$

and $$0 = \sum_i (w_i - y_i) \qquad (39)$$

$$= \sum_{i \in LVA} (w_i - y_i) - \sum_{i \in vhLV} y_i - \sum_{i \in nch} y_i + w_w - y_w$$

$$= \sum_{i \in LVA} \frac{Z_i K_{i,VL}(T)(1 - K_{i,VA}(T))}{LK_{i,VA}(T) + VK_{i,VA}(T)K_{i,VL}(T) + (1 - L - V)K_{i,VL}(T)} -$$

$$\sum_{i \in vhLV} \frac{Z_i K_{i,VL}(T)}{L + VK_{i,VL}(T)} - \frac{Z_{nch}}{V} + \frac{Z_w(1 - K_{ww}(T))}{1 - L - V + VK_{ww}(T)}$$

and $$0 = H - L \cdot h_{oil}(T, x_i(T, L, V)) - \qquad (40)$$
$$V \cdot h_{gas}(T, y_i(T, L, V)) - (1 - L - V) \cdot h_{wat}(T, w_i(T, L, V))$$

Similarly, if a temperature T is given instead of a total enthalpy H, then simply solve (38) and (39) at the given temperature T to determine the liquid and vapor splits L, V.

OG flash, $H_{c,wat} \leq H \leq H_{c,oil}$

Solve the following equations for unknowns V and T, $$0 = \sum_i (x_i - y_i) \qquad (41)$$

$$= \sum_{i \in nvh} x_i + \sum_{i \in vh} (x_i - y_i) - \sum_{i \in nch} y_i - y_w$$

$$= \frac{Z_{nvh}}{1 - V} + \sum_{i \in vh} \frac{Z_i(1 - K_{i,VL}(T))}{1 - V + VK_{i,VL}(T)} - \frac{Z_{nch}}{V} - \frac{Z_w}{V}$$

and $$0 = H - (1 - V) \cdot h_{oil}(T, x_i(T, V)) - V \cdot h_{gas}(T, y_i(T, V)) \qquad (42)$$

Similarly, if a temperature T is given instead of total enthalpy H, then simply solve equation (41) for the vapor split V.

GW flash, $H_{c,oil} \leq H \leq H_{c,wat}$

Solve the following equations for unknowns V and T, $$0 = \sum_i (w_i - y_i) \qquad (43)$$

$$= \sum_{i \in LVA} (w_i - y_i) - \sum_{i \in LV} y_i - \sum_{i \in nch} y_i + w_w - y_w$$

$$= \sum_{i \in LVA} \frac{Z_i(1.0 - K_{i,VA}(T))}{VK_{i,VA}(T) + 1 - V} - \frac{Z_{LV}}{V} - \frac{Z_{nch}}{V} +$$

$$\frac{Z_w(1 - K_{ww}(T))}{VK_{ww}(T) + 1 - V}$$

and $$0 = H - V \cdot h_{gas}(T, y_i(T, V)) - (1 - V) \cdot h_{wat}(T, w_i(T, V)) \qquad (44)$$

Similarly, if a temperature T is given instead of a total enthalpy H, then simply solve equation (43) for the vapor split V.

G flash, $H_1 \leq H$

Solve the following equation for T, $$H - h_{gas}(T, Z_i) = 0 \qquad (45)$$

If a temperature T is given instead of a total enthalpy H, then it is not necessary to solve equation (40) since all components reside in the gas phase so that the composition of the gas phase is completely known.

Solution of these flash calculations benefit from critical temperatures and phase splits calculated in the envelope. Note that a consequence of Eqs. (10) and (11) is that another K-value relation may be formed, i.e.

$$\frac{x_i}{w_i} = \frac{K_{i,VA}}{K_{i,VL}} = K_{i,LA} \qquad (46)$$

which may be used in the above equations. Use of this relation may allow a more generic form of the full mass and energy balance equations to be formulated.

Extension Of The Above Techniques To Higher Pressures

As stated above, the methods described herein may be used with lower pressures where solubilities and K-values are monotonic in temperature. However, as noted in FIGS. 5 and 6, a single component with high aqueous solubility may only have a single temperature with a minimum solubility or maximum K-value, i.e. where the derivative with respect to temperature changes sign. For example, as seen in FIG. 7, at a pressure of 350 Bar, multiple bubble points exist. Testing has been performed of parts of the envelope calculation described above at higher pressures using a high starting guess, and have found multiple roots, suggesting that the above techniques may be extended, at least for mixtures with a single component displaying these non-monotonic properties, to higher pressures. An example extension technique may include: (i) upon entering the flash with a given pressure, scan the K-values to ascertain if the derivative with respect to temperature changes sign, (ii) if so, search for a root in the lower and higher temperature regions, (iii) start at the upper-most temperatures where the final liquid phase leaves the system, and progressively work downwards. There may be two instances of critical points where phases appear or disappear, (iv) calculate the extra set of critical enthalpies and use these to determine the state of the fluid.

Nomenclature

A=aqueous phase mole fraction (split)
$h_{gas}$=gas phase enthalpy, $h_{gas}(P,T,y_i)$
$h_{oil}$=oil phase enthalpy, $h_{oil}(P,T,x_i)$
$h_{steam}$=steam enthalpy, $h_{steam}(P,T)$
$H_{c,gas}$=critical enthalpy at which a gas phase first appears
$H_{c,oil}$=critical enthalpy at which the oil or liquid phase leaves the system
$H_{c,wat}$=critical enthalpy at which the water phase leaves the system
H=total fluid enthalpy, e.g. Btu/total moles
$h_{wat}$=water phase enthalpy, $h_{wat}(P,T)$, determined from steam tables
$K_{i,VA}$=component i vapor-aqueous K-value, $$\frac{y_i}{w_i}$$

$K_{i,VL}$=component i liquid-vapor K-value, $$\frac{y_i}{x_i}$$

$K_{ww}$=water component K-value, $$\frac{y_w}{w_w}$$

L=liquid or oil phase split, moles oil phase/total moles
nch=non-condensable hydrocarbon
nvh=non-volatile hydrocarbon
$P_{wf}$=system pressure or flowing well pressure
T=temperature
$T_1$=temperature at which final liquid phase leaves the system, above which the state is gas only.
$T_2$=temperature at which the first liquid phase leaves the system. Between $T_2$ and $T_1$, the state will be either oil-gas or gas-water.
$T_3$=temperature at which gas first appears, bubble point. Between $T_3$ and $T_2$, the state is oil-gas-water.
V=vapor phase split, moles gas phase/total moles
vh=volatile hydrocarbon
$w_i$=water (aqueous) phase composition, moles component i/moles of water phase
$x_i$=oil (liquid) phase composition, moles component i/moles of oil phase
$y_i$=gas phase composition, moles component i/moles of gas phase
$Z_i$=sample feed, moles component i/total moles
$Z_{nch}$=sum of feed that is non-condensable
$Z_{nvh}$=sum of feed that has a zero LV K-value, i.e. non-volatile
$Z_w$=water feed, moles water/total moles Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims. In addition, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of determining distribution of a plurality of components among a plurality of phases for a multi-component, multi-phase system including a multi-component, multi-phase fluid, the method comprising:
  determining a plurality of phase boundaries of the multi-component, multi-phase fluid and a vapor-liquid equilibrium (VLE) based on a plurality of geophysical parameters associated with an oilfield and using one or more computer processors, including determining hydrocarbon partitioning in a water phase, based in part on applying empirical equilibrium multi-phase mole fraction ratios (K-values) of the multi-component, multi-phase system that are functions of temperature and pressure only, wherein applying empirical equilibrium multi-phase mole fraction ratios of the multi-component, multi-phase system that are functions of temperature and pressure only includes, for a first hydrocarbon component in the multi-component, multi-phase fluid that is soluble in liquid, water and vapor phases:
    applying a first empirical equilibrium multi-phase mole fraction ratio (K-value) for equilibrium between the liquid (L) and vapor (V) phases of the first hydrocarbon component; and
    applying a second empirical equilibrium multi-phase mole fraction ratio (K-value) for equilibrium between the water (A) and vapor (V) phases of the first hydrocarbon component; and
  predicting an amount of at least one fluid component distributed in a plurality of phases of the multi-component, multi-phase system by solving a set of flash equations with the one or more computer processors based on the plurality of phase boundaries.

2. The method of claim 1, further comprising performing an oilfield operation based upon the predicted amount.

3. The method of claim 1, further comprising modeling an oilfield operation using at least one computer-implemented simulator, wherein at least a portion of the oilfield is represented by a plurality of grid blocks in the simulator, wherein the plurality of phase boundaries are determined and the amount of the at least one fluid component distributed in the plurality of phases is predicted for each of the plurality of grid blocks.

4. The method of claim 3, further comprising determining phase states, phase splits, and phase mole fractions associated with each of the plurality of grid blocks.

5. The method of claim 1, wherein determining hydrocarbon partitioning is based in part on phase behavior and enthalpy of water described by a steam table that is a function of temperature and pressure.

6. The method of claim 1, wherein the plurality of geophysical parameters includes geophysical parameters selected from the group consisting of global mole fractions of one or more volatile hydrocarbon (VHC) components of oil, global mole fractions of one or more non-volatile hydrocarbon (NVHC) components of oil, global mole fractions of one or more non-condensable hydrocarbon (NCHC) components of oil, global mole fractions of one or more water components, a pressure of the inlaid-component, multi-phase fluid, an enthalpy of the multi-component, multi-phase fluid, a temperature of the multi-component, multi-phase fluid, a fluid phase saturation, a fluid phase density, a component density, and a component fraction by volume or mole in a particular phase.

7. The method of claim 1, wherein determining the plurality of phase boundaries includes:
determining at least one first temperature at which a first liquid phase associated with the plurality of phase boundaries disappears;
determining at least one second temperature at which a second liquid phase associated with the plurality of phase boundaries disappears; and
determining at least one third temperature at which the gaseous phase appears.

8. The method of claim 7, wherein the first liquid phase is present when the second liquid phase disappears, wherein the second temperature is determined based on the first temperature and is lower than or equal to the first temperature, wherein the third temperature is determined based on the second temperature and is lower than or equal to the second temperature, and wherein the at least one first, at least one second, and at least one third temperatures are determined in part by using pressure and temperature dependent empirical equilibrium multi-phase mole fraction ratios (K-values) of the multi-component, multi-phase system.

9. The method of claim 7, wherein determining the plurality of phase boundaries includes determining a succession of temperatures where a liquid phase may disappear and/or reappear one or more times.

10. The method of claim 7, further comprising one or both of determining at least one temperature at which an additional liquid phase disappears or determining at least one temperature at which an additional gaseous phase appears.

11. The method of claim 7, wherein determining the at least one first temperature at which the first liquid phase disappears includes determining the at least one first temperature at which oil disappears before water.

12. The method of claim 7, wherein determining the at least one first temperature at which the first liquid phase disappears includes determining the at least one first temperature at which water disappears before oil.

13. The method of claim 1, wherein predicting the amount of an at least one fluid component distributed in a plurality of phases of the multi-component, multi-phase system includes predicting the amount of a hydrocarbon component in liquid, water and gas phases.

14. An apparatus, comprising:
one or more computer processors; and
a memory having instructions that when executed by the one or more computer processors determine distribution of a plurality of components among a plurality of phases for a multi-component, multi-phase system including a multi-component, multi-phase fluid, the instructions including:
instructions to determine a plurality of phase boundaries of the multi-component, multi-phase fluid and a vapor-liquid equilibrium (VLE) based on a plurality of geophysical parameters associated with an oilfield, including instructions to determine hydrocarbon partitioning in a water phase, based in part on applying empirical equilibrium multi-phase mole fraction ratios (K-values) of the multi-component, multi-phase system that are functions of temperature and pressure only, wherein applying empirical equilibrium multi-phase mole fraction ratios of the multi-component, multi-phase system that are functions of temperature and pressure only includes, for a first hydrocarbon component in the multi-component, multi-phase fluid that is soluble in liquid, water and vapor phase;
applying a first empirical equilibrium multi-phase mole fraction ratio (K-value) for equilibrium between the liquid (L) and vapor (V) phases of the first hydrocarbon component; and
applying a second empirical equilibrium multi-phase mole fraction ratio (K-value) for equilibrium between the water (A) and vapor (V) phases of the first hydrocarbon component; and
instructions to predict an amount of at least one fluid component distributed in a plurality of phases of the multi-component, multi-phase system by solving a set of flash equations based on the plurality of phase boundaries.

15. A program product, comprising:
a non-transitory computer readable medium; and
program code stored on the non-transitory computer readable medium and configured upon execution by one or more computer processors to determine distribution of a plurality of components among a plurality of phases for a multi-component, multi-phase system including a multi-component, multi-phase fluid, the program code including:
instructions to determine a plurality of phase boundaries of the multi-component, multi-phase fluid and a vapor-liquid equilibrium (VLE) based on a plurality of geophysical parameters associated with an oilfield, including instructions to determine hydrocarbon partitioning in a water phase, based in part on applying empirical equilibrium multi-phase mole fraction ratios (K-values) of the multi-component, multi-phase system that are functions of temperature and pressure only, wherein applying empirical equilibrium multi-phase mole fraction ratios of the multi-component, multi-phase system that are functions of temperature and pressure only includes, for a first hydrocarbon component in the multi-component, multi-phase fluid that is soluble in liquid, water and vapor phases;
applying a first empirical equilibrium multi-phase mole fraction ratio (K-value) for equilibrium between the liquid (L) and vapor (V) phases of the first hydrocarbon component; and
applying a second empirical equilibrium multi-phase mole fraction ratio (K-value) for equilibrium between the water (A) and vapor (V) phases of the first hydrocarbon component; and
instructions to predict an amount of at least one fluid component distributed in a plurality of phases of the multi-component, multi-phase system by solving a set of flash equations based on the plurality of phase boundaries.

16. The apparatus of claim 14, wherein the instructions include instructions to model an oilfield operation using at least one computer-implemented simulator, wherein at least a portion of the oilfield is represented by a plurality of grid blocks in the simulator, wherein the plurality of phase boundaries are determined and the amount of the at least one fluid component distributed in the plurality of phases is predicted for each of the plurality of grid blocks, and wherein the instructions include instructions to determine phase states, phase splits, and phase mole fractions associated with each of the plurality of grid blocks.

17. The apparatus of claim 14, wherein the instructions determine hydrocarbon partitioning based in part on phase behavior and enthalpy of water described by a steam table that is a function of temperature and pressure.

18. The apparatus of claim 14, wherein the plurality of geophysical parameters includes geophysical parameters selected from the group consisting of global mole fractions of one or more volatile hydrocarbon (VHC) components of oil, global mole fractions of one or more non-volatile hydrocarbon (NVHC) components of oil, global mole fractions of one or more non-condensable hydrocarbon (NCHC) components of oil, global mole fractions of one or more water components, a pressure of the multi-component, multi-phase fluid, an enthalpy of the multi-component, multi-phase fluid, a temperature of the multi-component, multi-phase fluid, a fluid phase saturation, a fluid phase density, a component density, and a component fraction by volume or mole in a particular phase.

19. The apparatus of claim 14, wherein the instructions to determine the plurality of phase boundaries include instructions to:
determine at least one first temperature at which a first liquid phase associated with the plurality of phase boundaries disappears;
determine at least one second temperature at which a second liquid phase associated with the plurality of phase boundaries disappears; and
determine at least one third temperature at which the gaseous phase appears.

20. The apparatus of claim 19, wherein the first liquid phase is present when the second liquid phase disappears, wherein the second temperature is determined based on the first temperature and is lower than or equal to the first temperature, wherein the third temperature is determined based on the second temperature and is lower than or equal to the second temperature, and wherein the at least one first, at least one second, and at least one third temperatures are determined in part by using pressure and temperature dependent empirical equilibrium multi-phase mole fraction ratios (K-values) of the multi-component, multi-phase system.

21. The apparatus of claim 19, wherein the instructions to determine the plurality of phase boundaries include instructions to determine a succession of temperatures here a liquid phase may disappear and/or reappear one or more times.

22. The apparatus of claim 19, wherein the instructions include one or both of instructions to determine at least one temperature at which an additional liquid phase disappears or instructions to determine at least one temperature at which an additional gaseous phase appears.

23. The apparatus of claim 19, wherein the instructions to determine the at least one first temperature at which the first liquid phase disappears include instructions to determine the at least one first temperature at which oil disappears before water.

24. The apparatus of claim 19, wherein the instructions to determine the at least one first temperature at which the first liquid phase disappears include instructions to determine the at least one first temperature at which water disappears before oil.

25. The apparatus of claim 14, wherein the instructions to predict the amount of an at least one fluid component distributed in a plurality of phases of the multi-component, multi-phase system include instructions to predict the amount of a hydrocarbon component in liquid, water and gas phases.

* * * * *